(12) United States Patent
Liu et al.

(10) Patent No.: US 11,313,825 B2
(45) Date of Patent: Apr. 26, 2022

(54) GAS SENSOR AND METHOD OF MANUFACTURING THE SAME

(71) Applicant: NGK SPARK PLUG CO., LTD., Nagoya (JP)

(72) Inventors: Sunchao Liu, Nagoya (JP); Takehiro Oba, Nagoya (JP)

(73) Assignee: NGK SPARK PLUG CO., LTD., Aichi (JP)

(*) Notice: Subject to any disclaimer, the term of this patent is extended or adjusted under 35 U.S.C. 154(b) by 41 days.

(21) Appl. No.: 16/912,233

(22) Filed: Jun. 25, 2020

(65) Prior Publication Data

US 2021/0018461 A1    Jan. 21, 2021

(30) Foreign Application Priority Data

Jul. 18, 2019 (JP) .............................. JP2019-132603

(51) Int. Cl.
| | | |
|---|---|---|
| *G01N 27/407* | (2006.01) | |
| *G01N 27/406* | (2006.01) | |
| *G01N 27/409* | (2006.01) | |
| *C04B 35/00* | (2006.01) | |

(52) U.S. Cl.
CPC ......... *G01N 27/4077* (2013.01); *C04B 35/00* (2013.01); *G01N 27/409* (2013.01); *G01N 27/4062* (2013.01)

(58) Field of Classification Search
CPC ........... G01N 27/4062; G01N 27/4077; G01N 27/409; G01N 27/404; G01N 27/4074; G01N 27/41; G01N 33/004; G01N 33/0036–0054; C04B 35/00
See application file for complete search history.

(56) References Cited

U.S. PATENT DOCUMENTS

2018/0003669 A1* 1/2018 Nagata ................. G01N 27/304

FOREIGN PATENT DOCUMENTS

JP        2018-009958 A    1/2018

* cited by examiner

*Primary Examiner* — Gurpreet Kaur
(74) *Attorney, Agent, or Firm* — Sughrue Mion, PLLC (57) ABSTRACT

A gas sensor (1) including a sensor element (10) and a separator (90) having an element hole (90 *h*), as viewed from one of a forward-end or a rear-end side in the axial direction. The separator has end surfaces (90 *e*) located axially farthest toward the one of the forward-end or the rear-end side, recess regions (90 *h*), (90 *r* 1) and (90 *r* 2) recessed from the end surfaces, and regions R1 and R2. First regions R1 are determined by eliminating a region SB occupied by the sensor element from a region SA defined by imaginary short-side lines and the outer edge of the separator. Second regions R2 are determined by eliminating the region SB from a region SC defined by imaginary long-side lines and the outer edge of the separator. S2/S1≥0.5 is satisfied, where S1 is the total area of R1 and R2, and S2 is the total area of the recess regions.

7 Claims, 12 Drawing Sheets

GAS SENSOR AND METHOD OF MANUFACTURING THE SAME

BACKGROUND OF THE INVENTION

1. Field of the Invention

The present invention relates to a gas sensor including a sensor element for detecting the concentration of a subject gas, as well as to a method of manufacturing the same.

2. Description of the Related Art

One known gas sensor for detecting the concentration of oxygen or $NO_x$ in exhaust gas from an automobile, etc., includes a plate-shaped sensor element employing a solid electrolyte.

In a widely used gas sensor of this type, a plurality of electrode pads are provided on the outer surface of a rear-end portion of the plate-shaped sensor element, and metal terminal members are electrically in contact with the respective electrode pads to output a sensor output signal from the sensor element to the outside and to supply electric current to a heater stacked on the sensor element (Patent Document 1).

Figure 13A:
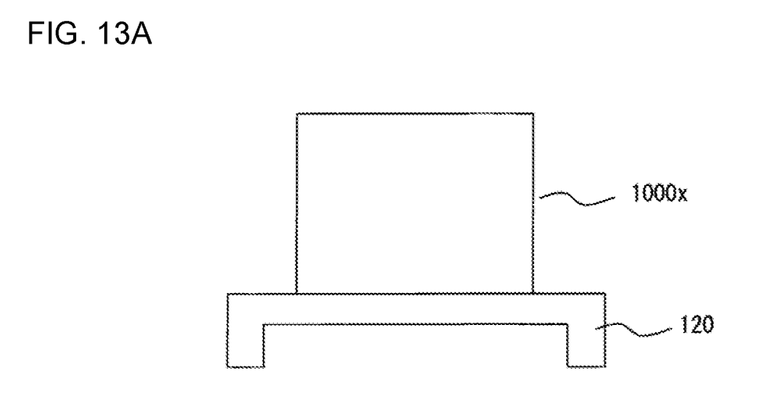
FIGS. 13A and 13B are process charts showing a conventional example method of manufacturing a separator.

In this gas sensor, a tubular separator formed of ceramic surrounds a rear end portion of the sensor element and holds the metal terminal members. The separator is manufactured as shown in FIG. 13A. Specifically, ceramic powder is compacted to the shape of the separator to form a green separator 1000x. Then, the green separator 1000x is placed on a firing bed (setter) 120 with its lower surface in contact with the bed, followed by firing.

[Patent Document 1] Japanese Patent Application Laid-Open (kokai) No. 2018-9958.

3. Problems to be Solved by the Invention

Figure 13B:
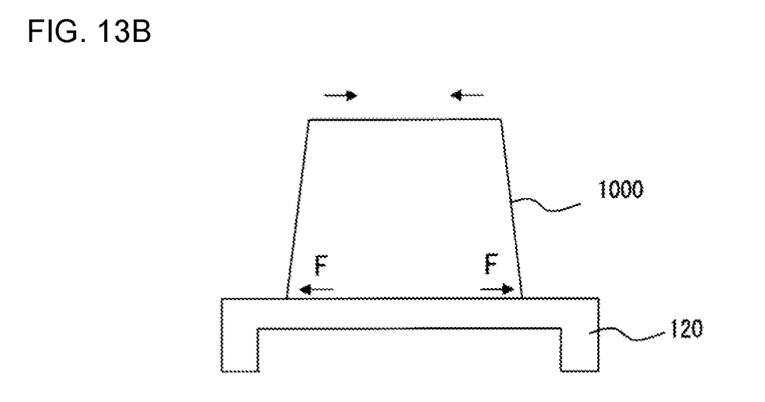

However, when the green separator 1000x of FIG. 13A is fired, a separator 1000 of FIG. 13B obtained by firing shrinks such that its upper surface has reduced dimensions. By contrast, since substantially the entirety of the lower surface of the green separator 1000x of FIG. 13A is in contact with the firing bed 120, frictional force F develops between the lower surface and the bed 120 as shown in FIG. 13B. This is a result of the tendency of the green separator 1000x to shrink, and the frictional force F restrains the shrinkage. Accordingly, the dimensional reduction in the lower surface of the separator 1000 obtained by firing is small. As a result, a dimensional (diametrical) difference arises between the upper surface and the lower surface of the separator 1000 obtained by firing. Thus, difficulty is encountered in obtaining an expected separator shape.

SUMMARY OF THE INVENTION

Accordingly, an object of the present invention is to provide a gas sensor which can improve the dimensional accuracy of the separator formed of ceramic and adapted to hold metal terminal members of the gas sensor, as well as a method of manufacturing the same.

DETAILED DESCRIPTION OF THE PREFERRED EMBODIMENTS

The above objection of the invention has been achieved by providing (1) a gas sensor comprising a sensor element extending in an axial direction, having an approximately rectangular cross section taken perpendicularly to the axial direction and having a pair of long sides and a pair of short sides, and having an electrode pad on an outer surface of a rear end portion thereof; a metal terminal member in direct contact with the electrode pad for electrical connection; and a separator formed of ceramic, having an element hole that extends therethrough in the axial direction while surrounding the rear end portion of the sensor element, and holding the metal terminal member such that the metal terminal member is exposed to the element hole. As viewed from a particular side in the axial direction which is a forward-end side or a rear-end side, the separator has an end surface which is a surface located farthest in the axial direction toward the particular side, and recess regions recessed from the end surface and including the element hole. In a view of the gas sensor from the particular side, a pair of first regions and a pair of second regions are present in the separator, where the first regions are determined by eliminating a region SB occupied by the sensor element from a region SA defined by an outer edge of the separator and imaginary short-side lines obtained by imaginarily extending the two short sides and where the second regions are determined by eliminating the region SB from a region SC defined by the outer edge of the separator and imaginary long-side lines obtained by imaginarily extending the two long sides such that the second regions do not overlap the first regions. The recess regions are present in all the first regions and the second regions which are located around the sensor element and the total number of which is four. A relation of S2/S1≥0.5 is satisfied, where S1 is a total area of the first regions and the second regions, and S2 is a total area of the recess regions including the element hole.

According to the gas sensor (1), when a green separator is placed on a firing bed for firing, by virtue of presence of the recess regions at its portion in contact with the firing bed, only an end surface of the green separator comes into contact with the firing bed, thereby reducing a contact area with the firing bed. Accordingly, since the frictional force between the green separator and the firing bed in firing is reduced, the frictional force does not hinder shrinkage of a lower-surface side of the green separator. Consequently, after firing, the upper surface and the lower surface of the separator exhibits similar shrinkage. As a result, the dimensional accuracy of the separator can be improved by preventing the occurrence of dimensional (diametral) differences between the upper and lower sides of the separator.

Meanwhile, a portion of the separator that requires a certain dimensional accuracy is a portion that surrounds the sensor element (electrode pads of the sensor element); namely, the first regions and the second regions. This is because the dimensional accuracy of the first regions and the second regions influences the positional accuracy of metal terminal members that face the electrode pads.

Therefore, by providing the recess regions in the first regions and the second regions, shrinkage of the first regions and the second regions in firing is not hindered, thereby improving the dimensional accuracy of the first regions and the second regions.

By satisfying the relation S2/S1≥0.5, the recess regions occupy ½ or more of the total area of the first regions and the second regions. Thus, the frictional force between the firing bed and the first and second regions can be reliably reduced, whereby the dimensional accuracy of the first regions and the second regions can be reliably improved.

Further, the four recess regions are present around the sensor element at circumferential intervals of 90 degrees such that the recess regions overlap the first regions and the second regions. Consequently, when a surface of the green separator on the firing bed side shrinks radially inward in firing, frictional force reduces substantially evenly in the circumferential direction with a resultant substantially even shrinkage of the surface in the circumferential direction. Therefore, the occurrence of dimensional (diametral) differences in the radial direction is prevented, whereby the dimensional accuracy of the separator can be further improved.

In a preferred embodiment (2) of the gas sensor (1) above, a relation of S4/S1≥0.5 is satisfied, where S4 is a remainder after eliminating an area S3 of the element hole from the total area S2 of the recess regions.

The element hole is a through hole. Thus, the element hole itself does not shrink during firing, whereas the recess regions located radially outward of the element hole shrink during firing. By satisfying the relation of S4/S1≥0.5, the recess regions that undergo shrinkage occupy ½ or more of the total area of the first regions and the second regions, whereby the dimensional accuracy of the first regions and the second regions can be further reliably improved.

In another preferred embodiment (3) of the gas sensor (1) or (2) above, the recess regions extend to an outer circumference of the separator.

The closer to the outer circumference of the separator, the greater the amount of shrinkage in firing. Thus, extension of the recess regions to the outer circumference of the separator further reduces the frictional force between the green separator and the firing bed, whereby the dimensional accuracy of the first regions and the second regions can be further reliably improved.

In yet another preferred embodiment (4) of the gas sensor of any of (1) to (3) above, the recess regions are present on both of the forward-end and rear-end sides of the separator.

According to the gas sensor (4), it is unnecessary to consider the orientation of the green separator with respect to the forward-end side and the rear-end side when the green separator is placed on the firing bed for firing. Therefore, productivity is improved.

In yet another preferred embodiment (5) of the gas sensor of any of (1) to (4) above, when the separator is placed on a horizontal surface with the end surface facing vertically downward, the separator stands by itself with only the end surface in contact with the horizontal surface.

According to the gas sensor (5), since the green separator stands by itself on a horizontal surface of the firing bed with its end surface in contact with the horizontal surface, there is no need to support the green separator against falling in firing; thus, productivity is improved.

In a second aspect (6), the present invention provides (6) a method of manufacturing a gas sensor, the gas sensor comprising: a sensor element extending in an axial direction, having an approximately rectangular cross section taken perpendicularly to the axial direction and having a pair of long sides and a pair of short sides, and having an electrode pad on an outer surface of a rear end portion; a metal terminal member in direct contact with the electrode pad for electrical connection; and a separator formed of ceramic, having an element hole that extends therethrough in the axial direction while surrounding the rear end portion of the sensor element, and holding the metal terminal member such that the metal terminal member is exposed to the element hole. As viewed from a particular side in the axial direction which is a forward-end side or a rear-end side, the separator has an end surface which is a surface located farthest in the axial direction toward the particular side, and recess regions recessed from the end surface and including the element hole. The method comprises a step of placing a green separator on a firing bed with the end surface facing the firing bed, followed by firing to obtain the separator. In a view of the green separator from the particular side, a pair of first regions and a pair of second regions are present. The first regions are determined by eliminating an element-insertion-expected region SD into which the sensor element is to be inserted, from a region SA defined by an outer edge of the green separator and imaginary short-side lines obtained by imaginarily extending a pair of short sides of the region SD. The second regions are determined by eliminating the region SD from a region SC defined by the outer edge of the green separator and imaginary long-side lines obtained by imaginarily extending a pair of long sides of the region SD such that the second regions do not overlap the first regions. The recess regions are present in all the first regions and the second regions which are located around the element-insertion-expected region SD and the total number of which is four. A relation of S2/S1≥0.5 is satisfied, where S1 is a total area of the first regions and the second regions, and S2 is a total area of the recess regions including the element hole of the green separator.

4. Effects of the Invention

In the gas sensor of the present invention, the separator formed of ceramic and holding the metal terminal members has improved dimensional accuracy.

DESCRIPTION OF REFERENCE NUMERALS

Reference numerals used to identify various features in the drawings include the following.

1: gas sensor
10: sensor element
11a: electrode pad

30: metal terminal member (forward metal terminal member)
90: separator (forward separator)
90e, 90ex: end surface
90h, 90hx: element hole (recess region)
90r1, 90r1x: first recess region (recess region)
90r2, 90r2x: second recess region (recess region)
90x: green separator
R1: first region
R2: second region
O: axial line
LA: short side
LB: long side

DETAILED DESCRIPTION OF THE PREFERRED EMBODIMENTS

An embodiment of the present invention will now be described by reference to the drawings. However, the present invention should not be construed as being limited thereto.

Figure 1:
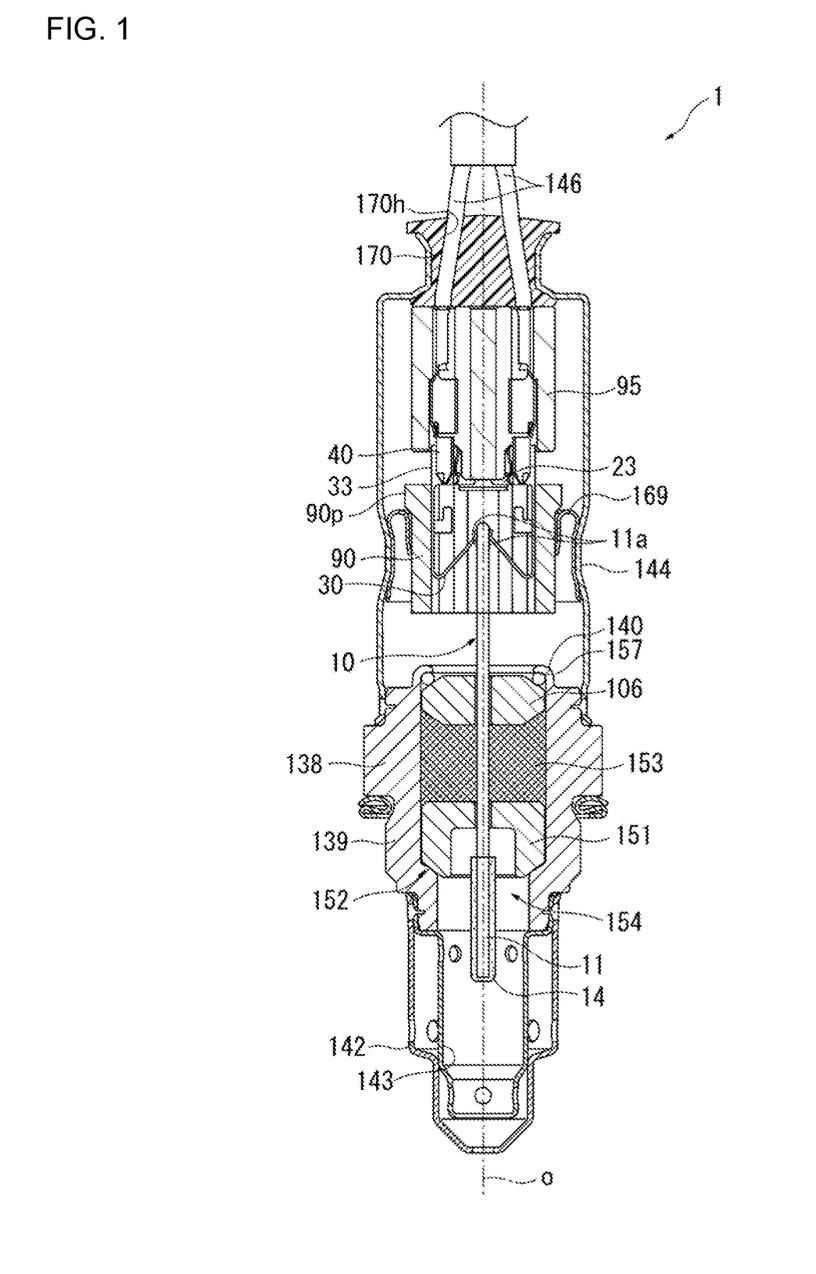
FIG. 1 is a sectional view of a gas sensor according to an embodiment of the present invention taken in an axial direction.
Figure 2:
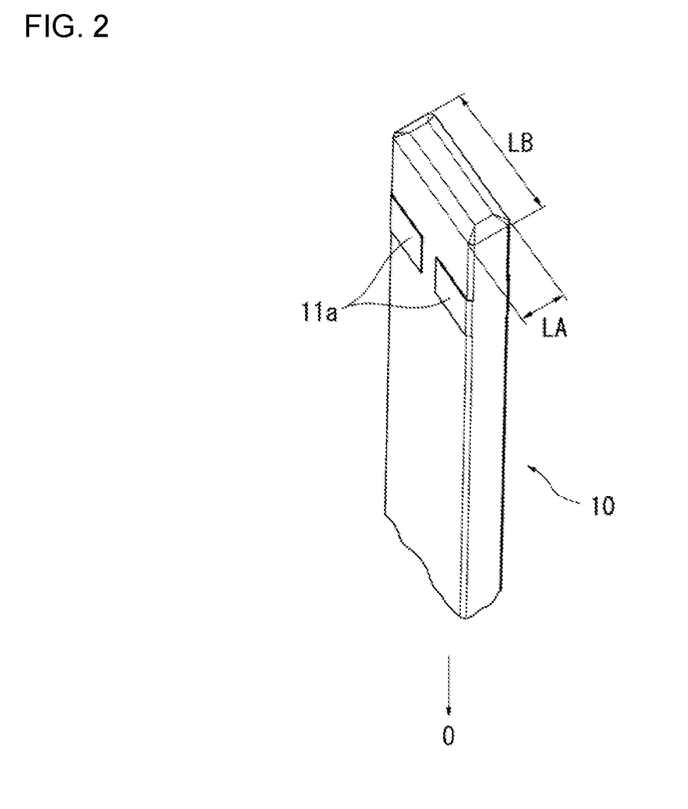
FIG. 2 is a perspective view of a rear end portion of a sensor element.
Figure 3:
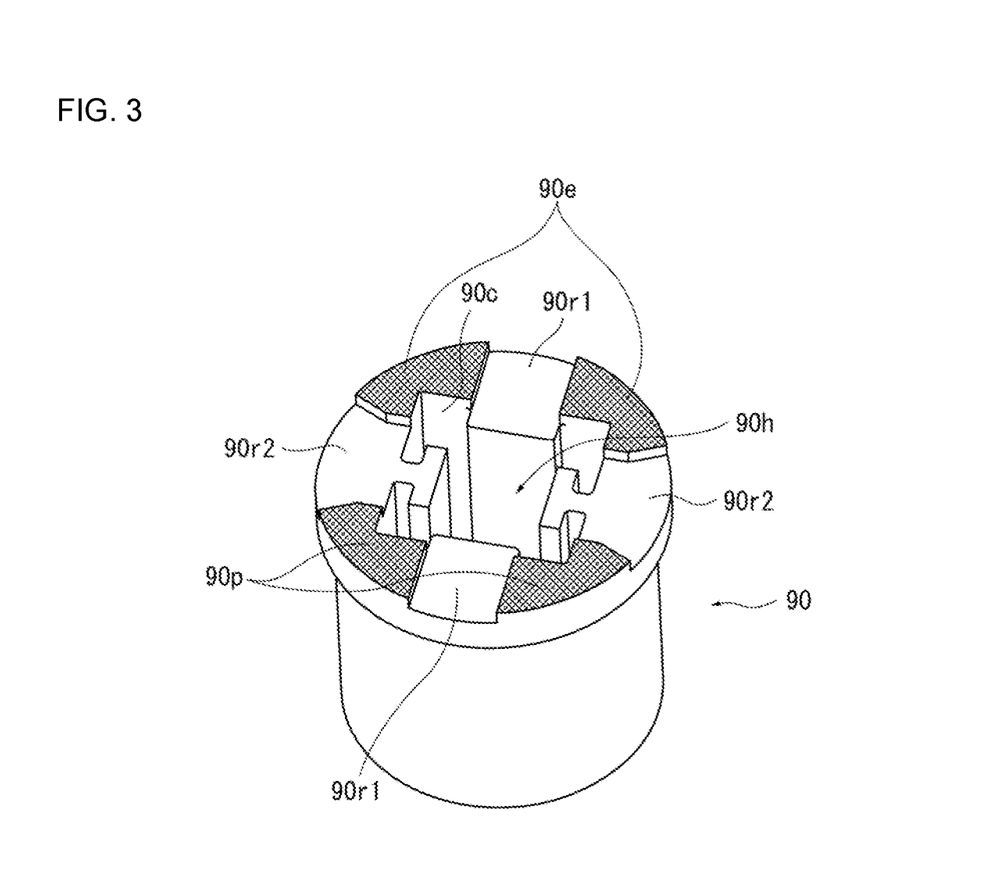
FIG. 3 is a perspective view of a forward separator.
Figures 4A, 4B:
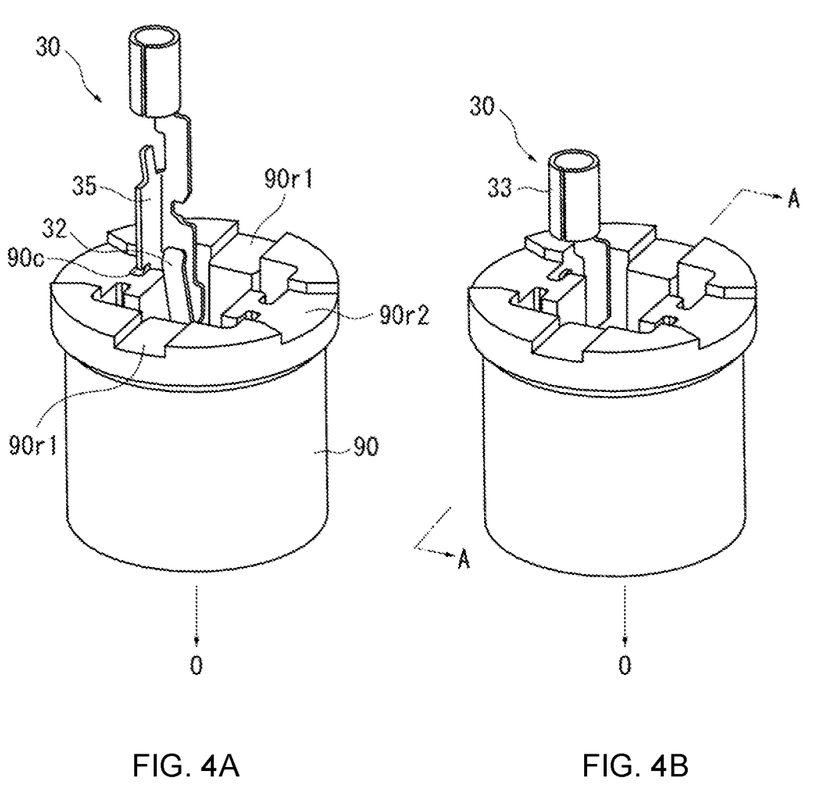
FIGS. 4A and 4B are views showing a step of attaching a forward metal terminal member to the forward separator.
Figure 5A:
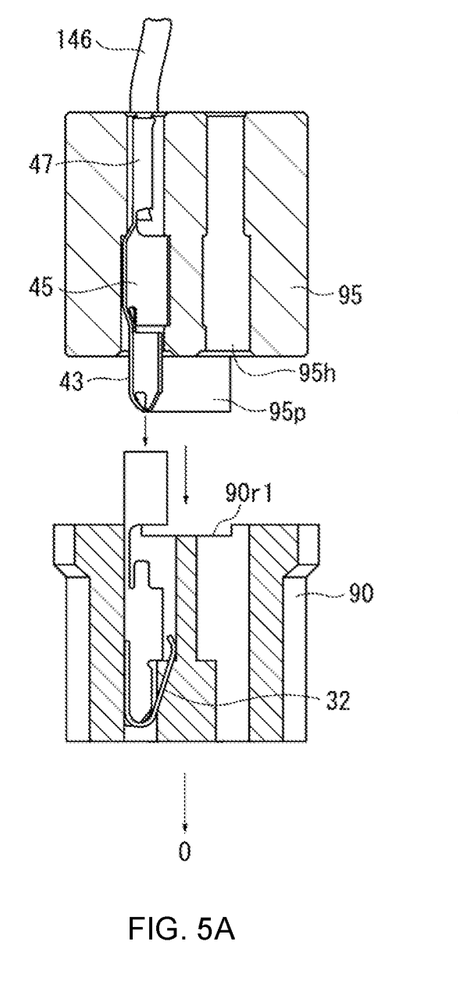
FIGS. 5A and 5B are sectional views taken along line A-A of FIG. 4B showing a step of assembling the forward separator and a rear separator together.
Figure 5B:
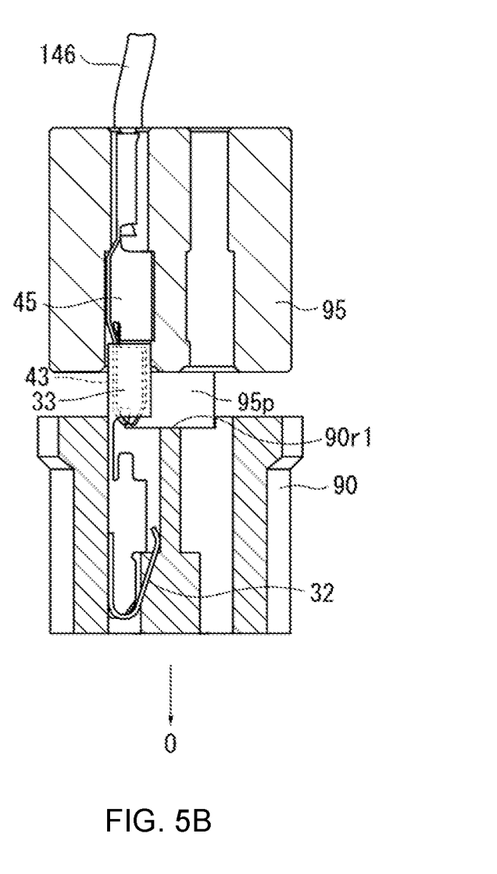

FIG. 1 is an overall sectional view of a gas sensor (oxygen sensor) 1 according to an embodiment of the present invention taken along an axial line O. FIG. 2 is a perspective view of a sensor element 10. FIG. 3 is a perspective view of a forward separator 90. FIGS. 4A and 4B are views showing a step of attaching a forward metal terminal member 30 to the forward separator 90. FIGS. 5A and 5B are sectional views taken along line A-A of FIG. 4B showing a step of assembling the forward separator 90 and a rear separator 95.

The gas sensor 1 is an oxygen sensor for detecting the concentration of oxygen in exhaust gas from automobiles and various internal combustion engines.

In FIG. 1, the gas sensor 1 includes a tubular metallic shell 138 having a threaded portion 139 formed on its outer surface and adapted for fixing to an exhaust pipe; a plate-shaped sensor element 10 extending in the direction of the axial line O (the longitudinal direction of the gas sensor 1, or the vertical direction in the drawing); a tubular ceramic sleeve 106 disposed so as to surround the circumference of the sensor element 10; a tubular forward separator 90 formed of ceramic and disposed so as to surround the circumference of a rear end portion of the sensor element 10 inserted into a forward internal space of the forward separator 90; four forward metal terminal members 30 (only two of them are illustrated in FIG. 1) held in the forward separator 90; a tubular rear separator 95 formed of ceramic; and four rear metal terminal members 40 (only two of them are illustrated in FIG. 1) held in the rear separator 95.

As described below, the rear separator 95 is disposed rearward of and in contact with the forward separator 90 for mutual connection.

The forward metal terminal members 30 are disposed forward of and connected to the corresponding rear metal terminal members 40. The forward separator 90 and the forward metal terminal members 30 correspond to the "separator" and "metal terminal member," respectively.

As shown in FIG. 2, two electrode pads 11a are disposed on each of opposite sides of a rear end portion of the sensor element 10 and are arranged in its width direction. The sensor element 10 has an approximately rectangular cross section taken perpendicularly to the direction of the axial line O, and the rectangular shape has a pair of long sides LB and a pair of short sides LA.

The electrode pads 11a may be formed of, for example, a sintered body composed mainly of Pt. A gas detection portion 11 at the forward end of the sensor element 10 is covered with a porous protection layer 14 formed of, for example, alumina.

The metallic shell 138 is an approximately tubular member formed of stainless steel and having a through hole 154 extending therethrough in the axial direction and a ledge portion 152 protruding toward a radially inward region of the through hole 154. The sensor element 10 is disposed in the through hole 154 such that its forward end portion protrudes from the forward end of the through hole 154. The ledge portion 152 has an inward tapered surface inclined with respect to a plane perpendicular to the direction of the axial line.

Within the through hole 154 of the metallic shell 138, an approximately annular ceramic holder 151 formed of alumina, a powder filler layer 153 (hereinafter also referred to as a talc ring 153), and the above-described ceramic sleeve 106 are stacked in this order from the forward end side to the rear end side so as to surround the circumference of the sensor element 10.

A crimp packing 157 is disposed between the ceramic sleeve 106 and a rear end portion 140 of the metallic shell 138. The rear end portion 140 of the metallic shell 138 is crimped so as to press the ceramic sleeve 106 forward through the crimp packing 157.

As shown in FIG. 1, a dual protector formed of metal (e.g., stainless steel) is attached by welding to the outer circumference of a forward end portion (a lower portion in FIG. 1) of the metallic shell 138 and covers a protruding portion of the sensor element 10. The dual protector has a plurality of holes and is composed of an outer protector 142 and an inner protector 143.

An outer casing 144 is fixed to the outer circumference of a rear end portion of the metallic shell 138. Lead wires 146 are connected to rear end portions of the respective rear metal terminal members 40 and extend rearward from the rear end of the rear separator 95.

A grommet 170 formed of rubber is disposed in a rear end (an upper end in FIG. 1) opening portion of the outer casing 144 and has lead wire insertion holes 170h into which six lead wires 146 (only two of them are illustrated in FIG. 1) extending from the rear separator 95 are inserted.

The forward separator 90 is disposed around a rear end portion (an upper end portion in FIG. 1) of the sensor element 10 protruding from the rear end portion 140 of the metallic shell 138 and has a collar portion 90p protruding radially outward from the outer surface of the forward separator 90. The collar portion 90p abuts against the outer casing 144 through a holding member 169, and the forward separator 90 is thereby held within the outer casing 144.

The rear separator 95 is disposed between the grommet 170 and the forward separator 90, and elastic force of the grommet 170 causes the rear separator 95 to forwardly press the forward separator 90. As a result, the collar portion 90p is pressed against the holding member 169, and the forward separator 90 and the rear separator 95 are thereby held within the outer casing 144 in a mutually connected condition (i.e., without separation in the direction of the axial line O).

As shown in FIG. 3, the forward separator 90 has a rectangular element hole 90h formed at its center and extending therethrough in the direction of the axial line O and has four groove portions 90c surrounding the element hole 90h from each of its four radially outer corners. As shown in FIGS. 4A and 4B, when each forward metal terminal member 30 is inserted into the groove portion 90c from the rear side (FIG. 4A), the forward metal terminal member 30 is held within the forward separator 90 (FIG. 4B).

In this manner, the element hole 90h surrounds a rear end portion of the sensor element 10, and the forward metal terminal members 30 held in the respective groove portions 90c are exposed to the element hole 90h, face the outer surface of the rear end portion of the sensor element 10, and are in direct contact with the respective electrode pads 11a (see FIG. 1) formed on the outer surface of the sensor element 10 for electrical connection.

As shown in FIGS. 4A and 4B, each forward metal terminal member 30 as a whole extends in the direction of the axial line O and integrally includes a connection portion 33 to be connected to a corresponding rear metal terminal member 40, a body portion 35 having an approximately L-shaped cross section and connected to the forward end of the connection portion 33, and an elastic portion 32 bent toward the sensor element 10 at the forward end of the body portion 35. The body portion 35 is inserted into and held in the corresponding groove portion 90c. The elastic portion 32 is elastically connected to the corresponding electrode pad 11a. The shapes of adjacent ones of the four forward metal terminal members 30 within the forward separator 90 are line-symmetric.

The connection portions 33 of the forward metal terminal members 30 held in the forward separator 90 protrude rearward from the forward separator 90 (FIG. 4B).

As shown in FIG. 5A, each rear metal terminal member 40 as a whole extends in the direction of the axial line O and integrally includes a crimp terminal portion 47 located at its rear end and connected to a corresponding lead wire 146; a cylindrical large-diameter portion 45 having a C-shaped cross section and located forward of the crimp terminal portion 47; and a cylindrical forward end portion 43 having a C-shaped cross section and connected to the forward end of the large-diameter portion 45.

Each of the forward metal terminal members 30 and the rear metal terminal members 40 can be produced, for example, by punching a blank from a single metal sheet (e.g., SUS304) and bending the punched blank into a prescribed shape, but this is not a limitation of the invention.

The rear separator 95 has a cylindrical shape and has four insertion holes 95h arranged circumferentially, and the rear metal terminal members 40 are inserted into and held in the respective insertion holes 95h (FIG. 5A).

The forward end portions 43 of the rear metal terminal members 40 protrude forward from a forward-facing surface of the rear separator 95.

As shown in FIGS. 4A and 4B, the forward separator 90 has second recess regions 90r2 formed in its rearward-facing surface as described in detail below.

As shown in FIGS. 5A and 5B, the rear separator 95 has two protrusions 95p protruding forward from the peripheral edge portion of the forward-facing surface of the rear separator 95 while expanding in the width direction of the sensor element 10.

The rear separator 95 is disposed rearward of the forward separator 90 in the direction of the axial line O. The protrusions 95p of the rear separator 95 are engaged with the respective second recess regions 90r2 of the forward separator 90. The forward separator 90 and the rear separator 95 are held between the holding member 169 and the grommet 170 of FIG. 1 to thereby be connected together (FIG. 5B).

At this time, the forward end portion 43, which protrudes forward from the rear separator 95, of each rear metal terminal member 40 is fitted into the cylindrical connection portion 33, which has a C-shaped cross section and protrudes rearward from the forward separator 90, of each forward metal terminal member 30, whereby the rear metal terminal member 40 and the forward metal terminal member 30 are electrically connected. In this case, the forward metal terminal members 30 are indirectly connected to the lead wires 146 through the rear metal terminal members 40.

Next, a feature of the invention will be described with reference to FIGS. 3, 6, and 7.

As shown in FIG. 3, as viewed from the rear-end side (particular side), the forward separator 90 has four end surfaces (protruding surfaces) 90e located furthest rearward, first recess regions 90r1 recessed from the end surfaces 90e, the second recess regions 90r2 recessed from the end surfaces 90e, and the element hole 90h recessed from the end surfaces 90e. For easy understanding, the four end surfaces 90e are hatched.

The first recess regions 90r1, the total number of which is two, are formed on opposite sides of the element hole 90h in a short-side direction of the sensor element 10. The second recess regions 90r2 the total number of which is two, are formed on opposite sides of the element hole 90h in a long-side direction of the sensor element 10.

Each of the four end surfaces 90e is formed at a portion of the separator 90 surrounded by the element hole 90h and the first recess region 90r1 and the second recess region 90r2 located adjacent to each other.

The first recess regions 90r1, the second recess regions 90r2, and the element hole 90h collectively correspond to the "recess regions" in the claims.

Figure 6:
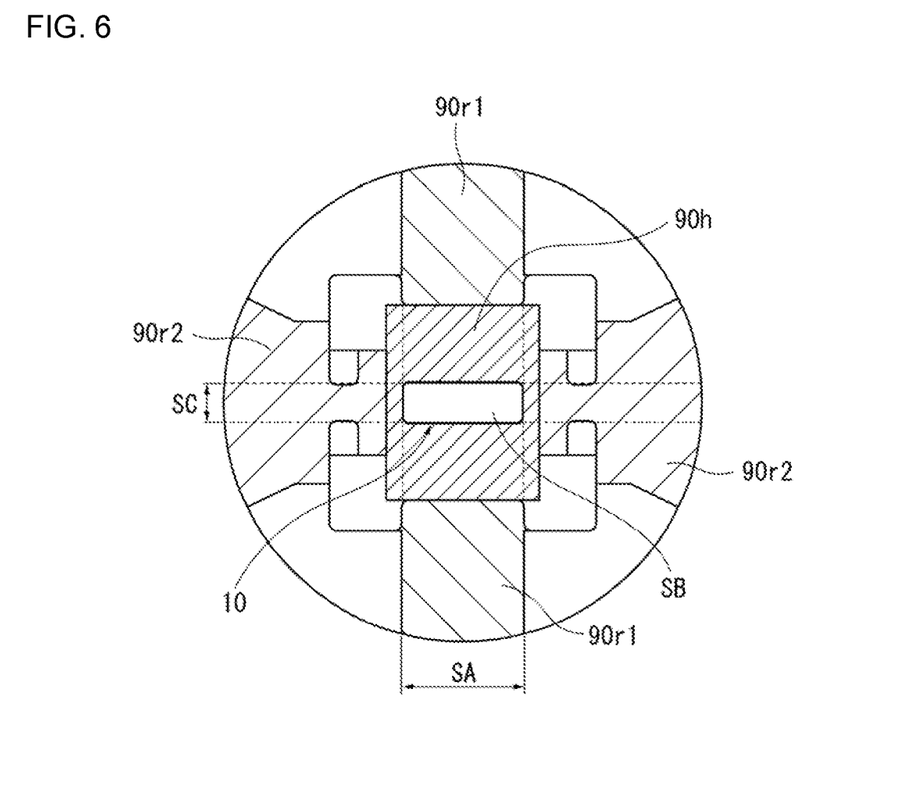
FIG. 6 is a plan view showing regions of the forward separator.

As shown in FIG. 6, in a view of the gas sensor 1 (specifically, the forward separator 90 in a state in which the sensor element 10 is disposed in the gas sensor 1) from the rear-end side (particular side), an SA region is defined by the outer edge of the forward separator 90 and imaginary short-side lines obtained by imaginarily extending a pair of short sides LA. An SB region is a region occupied by the sensor element 10. An SC region is defined by the outer edge of the forward separator 90 and imaginary long-side lines obtained by imaginarily extending a pair of long sides LB.

Figure 7:
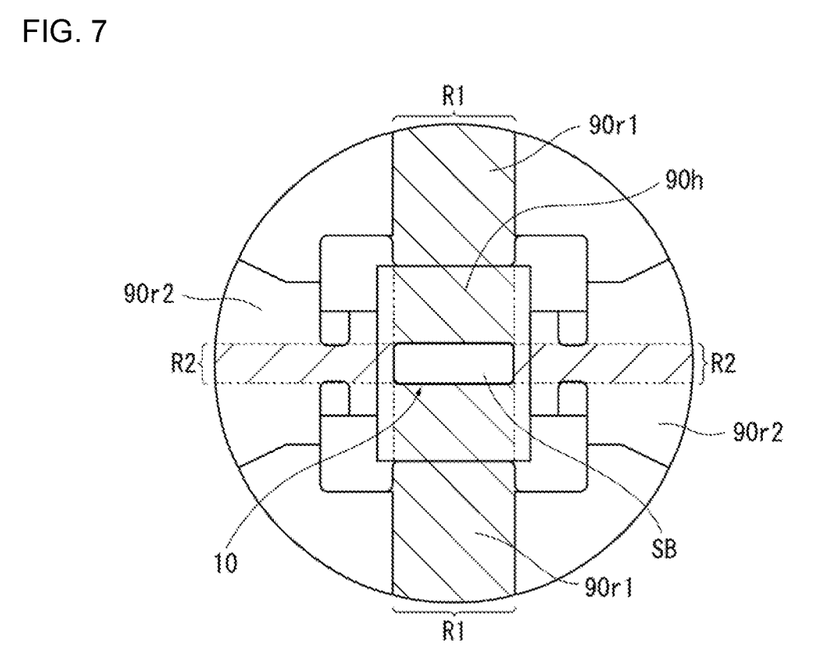
FIG. 7 is another plan view showing the regions of the forward separator.

As shown in FIG. 7, first regions R1 are determined by eliminating the SB region from the SA region. Second regions R2 are determined by eliminating the SB region from the SC region such that the second regions R2 do not overlap the first regions R1.

The first regions R1, the total number of which is two, are located on opposite sides of the sensor element 10 in the short-side direction of the sensor element 10. The second regions R2, the total number of which is two, are located on opposite sides of the sensor element 10 in the long-side direction of the sensor element 10.

A recess region (one of the first recess regions 90r1, the second recess regions 90r2, and the element hole 90h) is present in each of regions (i.e., the first regions R1 and the second regions R2) which are located around the sensor element 10 and the total number of which is four. A relation of S2/S1≥0.5 is satisfied, where S1 is the total area of the first regions R1 and the second regions R2, and S2 is the total area of the recess regions (the first recess regions 90r1, the second recess regions 90r2, and the element hole 90h). Notably, S1 and S2 are projected areas.

Specifically, in the present embodiment, the element hole 90h overlaps element-side portions of the first regions R1 and the second regions R2 while surrounding the sensor element 10. In a region located radially outward of the element hole 90h, the two second recess regions 90r2 encompass and expand beyond the two second regions R2, respectively, and the two first recess regions 90r1 completely overlap the two first regions R1, respectively.

The first recess regions 90r1 and the second recess regions 90r2 communicate with (are connected to) the element hole 90h at their radially inward side.

Figure 8A:
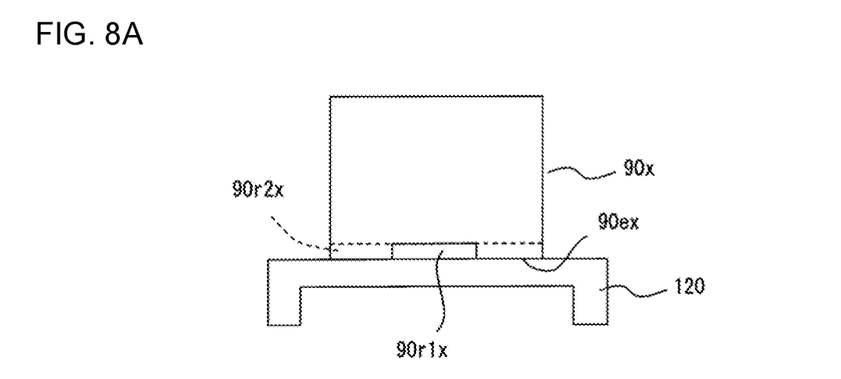
FIGS. 8A and 8B are process charts showing an example method of manufacturing the forward separator.
Figure 8B:
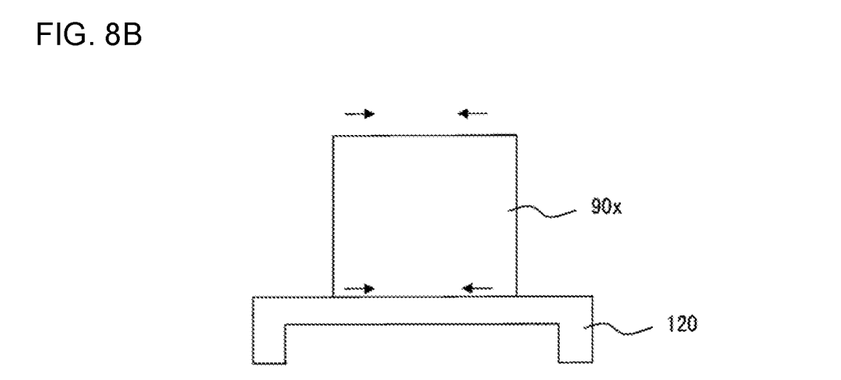

The forward separator 90 can be manufactured as shown in FIGS. 8A and 8B.

Figure 9:
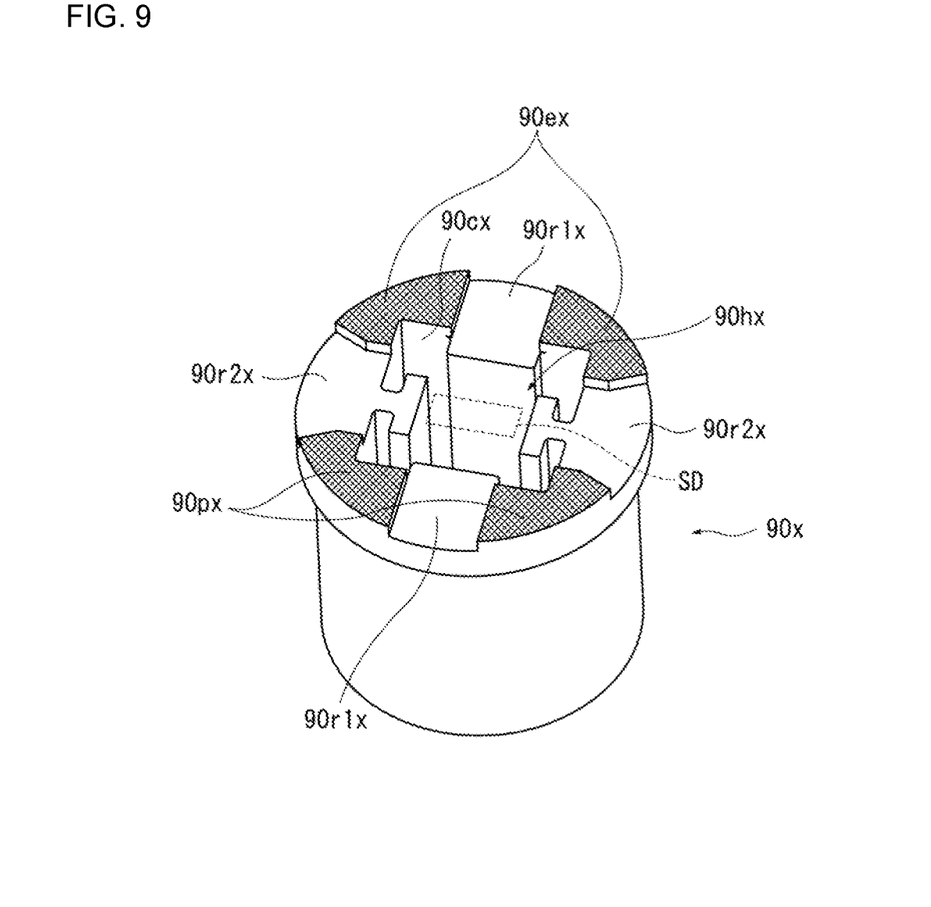
FIG. 9 is a perspective view of a green separator.

First, ceramic powder is compacted to form a green separator 90x shown in FIG. 9. The green separator 90x becomes the forward separator 90 through firing, is slightly larger in size than the forward separator 90 obtained through firing, and is substantially similar to the forward separator 90.

In FIG. 9, the constituent elements of the green separator 90x are denoted by reference numerals corresponding to those of the forward separator 90 in FIG. 3 with the suffix "x" added. In view of the correspondence of the constituent elements before and after firing, a description of the constituent elements is omitted. For example, the end surfaces 90e of the forward separator 90 correspond to end surfaces 90ex of the green separator 90x.

In the green separator 90x, a region in which the sensor element 10 is to be inserted (the sensor element 10 is to be disposed) is called an element-insertion-expected region SD.

The element-insertion-expected region SD cannot be defined by merely viewing the green separator 90x. The element-insertion-expected region SD is defined as follows. The short-side direction of the sensor element 10 is oriented to that of the sensor element 10 attached to the forward separator 90, the sensor element 10 is enlarged by the ratio between the separator 90 and the green separator 90x, and the enlarged sensor element 10 is aligned with the green separator 90x such that the center of gravity of the enlarged sensor element 10 coincides with that of the green separator 90x as viewed from the above-mentioned rear-end side (particular side). The outline of the enlarged sensor element 10 defines the element-insertion-expected region SD. The difference in size between the separator 90 and the green separator 90x can be obtained by calculation from a publicly known shrinkage factor of ceramic in firing or by an experiment in which a green separator of the same material and shape as those of the present embodiment is actually fired under the same condition.

For example, in the case where the size of the separator shrinks to ¾ as a result of firing, the size of the element-insertion-expected region SD is ⁴⁄₃ of the size of the sensor element 10 (yielded by firing).

As shown in FIG. 8A, the green separator 90x is placed on a firing bed (setter) 120 with the end surfaces (lower surfaces) 90ex of the green separator 90x facing the upper surface of the firing bed 120, followed by firing to form the forward separator 90.

By virtue of the presence of recess regions (first recess regions 90r1x, second recess regions 90r2x, and an element hole 90hx) in a region in contact with the firing bed 120, only the end surfaces 90ex of the green separator 90x come into contact with the firing bed 120, thereby reducing the contact area with the firing bed 120. Accordingly, as shown in FIG. 8B, since the frictional force between the green separator 90x and the firing bed 120 in firing is reduced, the frictional force does not hinder shrinkage of a lower-surface side of the green separator 90x, so that, after firing, the upper surface and the lower surface of the forward separator 90 exhibit similar shrinkage. As a result, the dimensional accuracy of the separator 90 can be improved by preventing the occurrence of dimensional (diametral) differences between the upper and lower sides of the separator 90.

Meanwhile, a portion of the forward separator 90 that is required to have a certain dimensional accuracy is a portion that surrounds the sensor element 10 (the electrode pads 11a of the sensor element 10); namely, the first regions R1 and the second regions R2. This is because the dimensional accuracy of the first regions R1 and the second regions R2 influences the positional accuracy of the forward metal terminal members 30 that face the electrode pads 11a.

Therefore, by providing the recess regions in the first regions R1 and the second regions R2, shrinkage of the first regions R1 and the second regions R2 in firing is not hindered, thereby improving the dimensional accuracy of the first regions R1 and the second regions R2.

By satisfying a relation of S2/S1≥0.5, the recess regions occupy ½ or more of the total area of the first regions R1 and the second regions R2. Thus, the frictional force between the firing bed 120 and the first regions R1 and second regions R2 can be reliably reduced, whereby the dimensional accuracy of the first regions R1 and the second regions R2 can be reliably improved.

Figure 10:
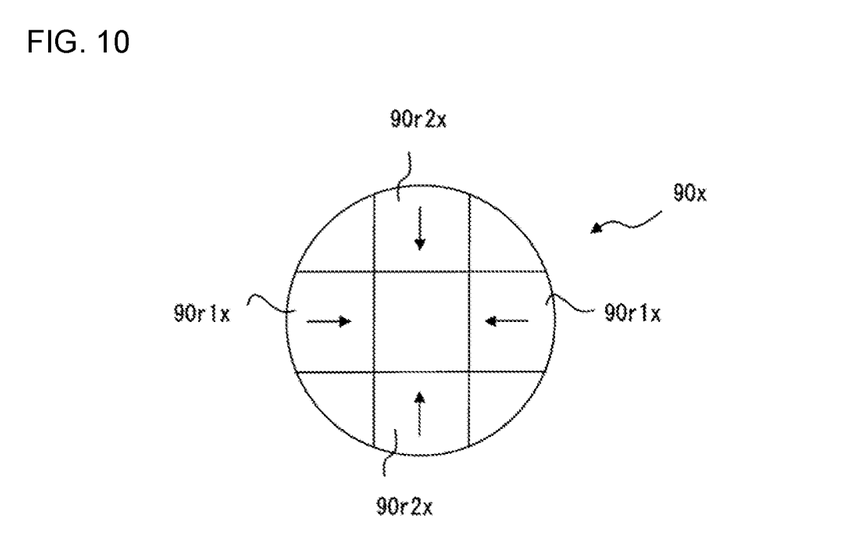
FIG. 10 is a plan view showing radial shrinkage of the green separator in firing.

Further, since the four recess regions (i.e., the two first recess regions 90r1x and the two second recess regions 90r2x) are present around the element-insertion-expected region SD at circumferential intervals of 90 degrees while overlapping the first regions R1 and the second regions R2, respectively, as shown in FIG. 10, when the surface of the green separator 90x on the firing bed 120 side shrinks radially inward in firing, frictional force is reduced substantially evenly in the circumferential direction, and the surface shrinks substantially evenly in the circumferential direction. Therefore, the occurrence of dimensional (diametral) difference in the radial direction is prevented, whereby the dimensional accuracy of the separator can be further improved.

Figure 11:
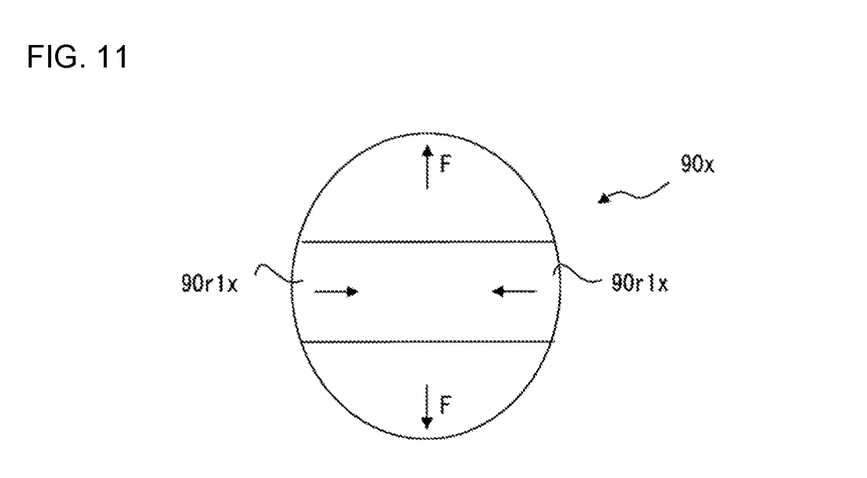
FIG. 11 is a plan view showing radial shrinkage in the firing of a green separator having only two recess regions.

By contrast, in the case where only two mutually facing first recess regions 90r1x are provided with the element-insertion-expected region SD present therebetween, as shown in FIG. 11, no recess region is present in the direction (the vertical direction of FIG. 11) crossing the first recess regions 90r1x. Consequently, the contact area with the firing bed 120 is not reduced. As a result, in the direction crossing the first recess regions 90r1x, frictional force F is developed between the green separator 90x and the firing bed 120 and hinders shrinkage. Accordingly, the degree of radial shrinkage in the direction crossing the first recess regions 90r1x differs from that in the direction of the first recess regions 90r1x (the horizontal direction of FIG. 11) in which the frictional force is small, resulting in the occurrence of dimensional (diametral) differences in the radial direction. As a result, a separator thus obtained has a nonuniform cross section (an elliptical cross section).

Notably, in the present invention, the term "separator" refers to a separator having the element hole 90h that surrounds a rear end portion of the sensor element 10, and that is adapted to hold the metal terminal members 30. This is because, as mentioned above, a portion of the separator that is required to have a certain dimensional accuracy is a portion of the forward separator 90 that surrounds the sensor element 10 and holds the metal terminal members 30 (the first regions R1 and the second regions R2).

By contrast, the rear separator 95 holds the metal terminal members 40; however, the metal terminal members 40 are connected to the respective metal terminal members 30, but are not brought into direct contact with the electrode pads 11a of the sensor element 10. Therefore, the rear separator 95 does not correspond to the "separator" of the invention.

Figure 12:
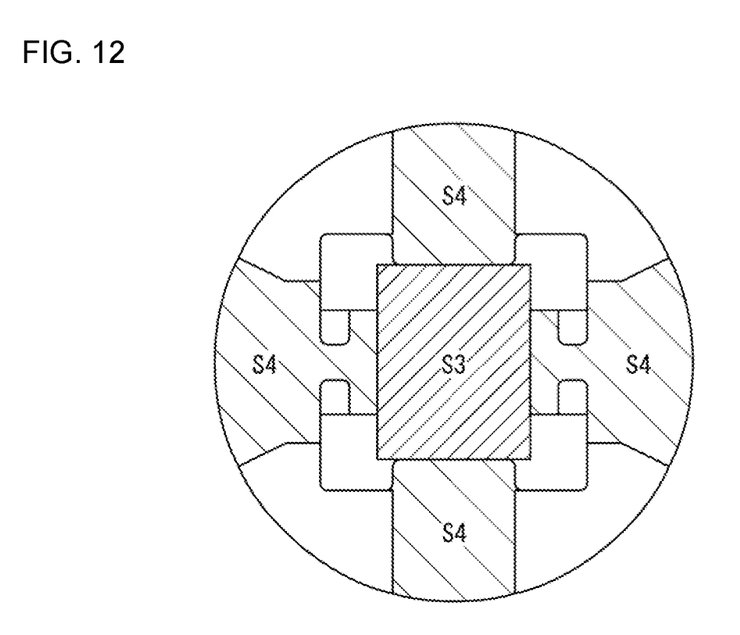
FIG. 12 is another plan view showing the regions of the forward separator.

As shown in FIG. 12, the present embodiment satisfies a relation of S4/S1≥0.5, where S4 is a remainder after eliminating an area S3 of the element hole 90h from the total area S2 of the recess regions (i.e., S4 is the total area of the first recess regions 90r1 and the second recess regions 90r2).

The element hole 90h is a through hole. Thus, the element hole 90h itself does not shrink during firing, whereas the first recess regions 90r1 and the second recess regions 90r2 located radially outward of the element hole 90h shrink during firing.

By satisfying the relation of S4/S1≥0.5, the first recess regions 90r1 and the second recess regions 90r2 that undergo shrinkage occupy ½ or more of the total area S1 of the first regions R1 and the second regions R2, whereby the dimensional accuracy of the first regions R1 and the second regions R2 can be further reliably improved.

In the present embodiment, as shown in FIG. 3, the recess regions (the first recess regions 90r1 and the second recess regions 90r2) extend to the outer circumference of the forward separator 90.

The closer to the outer circumference of the forward separator 90, the greater the amount of shrinkage in firing. Thus, extension of the recess regions to the outer circumference of the forward separator 90 further reduces the frictional force between the green separator 90x and the firing bed 120, whereby the dimensional accuracy of the first regions R1 and the second regions R2 can be further reliably improved.

In the case where the recess regions are provided on both of the forward-end side and the rear-end side of the forward separator 90, it is unnecessary to consider the orientation of the green separator 90x with respect to the forward-end side and the rear-end side when the green separator 90x is placed on the firing bed 120 for firing. Therefore, productivity is improved.

Preferably, when the forward separator 90 is placed on a horizontal surface with the end surfaces 90e facing vertically downward, the forward separator 90 stands by itself with only the end surfaces 90e in contact with the horizontal surface.

In this case, as shown in FIG. 8A, since the green separator 90x substantially similar to the forward separator 90 stands by itself on the horizontal upper surface of the firing bed 120 with its end surfaces (lower surfaces) 90ex in contact with the horizontal surface, there is no need to support the green separator 90x against falling in firing; thus, productivity is improved.

It will be appreciated that the present invention is not limited to the embodiment described above and encompasses various modifications and equivalents within the spirit and scope of the present invention.

For example, it may be the case that only the element hole is provided as the recess regions. However, in this case, in order to satisfy the relation of S2/S1≥0.5, the element hole must have a large size. Since increasing the size of the element hole reduces the strength of the separator, preferably, the separator has a recess region (a bottomed recess region) in addition to the element hole.

The bottomed recess regions are not limited to those which communicate with (are connected to) the outer periphery of the element hole 90h as in the case of the first recess regions 90r1 and the second recess regions 90r2 of the present embodiment. The first recess regions 90r1 and the second recess regions 90r2 may be formed radially outward of and separated from the element hole 90h (i.e., the end surfaces 90e also intervene between the element hole 90h and the first and second recess regions 90r1 and 90r2).

No particular limitation is imposed on the gas sensor. Examples of the gas sensor include, in addition to the oxygen sensor, a $NO_x$ sensor and a full range gas sensor.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. JP 2019-132603 filed Jul. 18, 2019, incorporated herein by reference in its entirety.

What is claimed is:

1. A gas sensor comprising:
   a sensor element extending in an axial direction, having an approximately rectangular cross section taken perpendicularly to the axial direction and having a pair of long sides and a pair of short sides, the sensor element having an electrode pad on an outer surface of a rear end portion thereof;
   a metal terminal member in direct contact with the electrode pad for electrical connection; and
   a separator formed of ceramic, having an element hole that extends therethrough in the axial direction while surrounding the rear end portion of the sensor element, and holding the metal terminal member such that the metal terminal member is exposed to the element hole,
   as viewed from one of a forward-end side or a rear-end side in the axial direction, the separator has an end surface which is a surface located farthest in the axial direction toward the one of the forward-end side or the read-end side, and recess regions recessed from the end surface and including the element hole;
   wherein, in a view of the gas sensor from the one of the forward-end side or the rear-end side, a pair of first regions and a pair of second regions are present in the separator, where the first regions are determined by eliminating a region SB occupied by the sensor element from a region SA defined by an outer edge of the separator and imaginary short-side lines obtained by imaginarily extending the two short sides and where the second regions are determined by eliminating the region SB from a region SC defined by the outer edge of the separator and imaginary long-side lines obtained by imaginarily extending the two long sides such that the second regions do not overlap the first regions,
   wherein the recess regions are present in all the first regions and the second regions which are located around the sensor element and the total number of which is four, and
   wherein a relation of S2/S1≥0.5 is satisfied, where s1 is a total area of the first regions and the second regions, and S2 is a total area of the recess regions including the element hole.

2. The gas sensor as claimed claim 1, wherein a relation of S4/S1≥0.5 is satisfied, where S4 is a remainder after eliminating an area S3 of the element hole from the total area S2 of the recess regions.

3. The gas sensor as claimed in claim 1, wherein the recess regions extend to an outer circumference of the separator.

4. The gas sensor as claimed in claim 1, wherein the recess regions are present on both of the forward-end and rear-end sides of the separator.

5. The gas sensor as claimed in claim 1, wherein when the separator is placed on a horizontal surface with the end surface facing vertically downward, the separator stands by itself with only the end surface in contact with the horizontal surface.

6. The gas sensor as claimed in claim 1, wherein two of the recess regions are present at opposing short sides of the sensor element and another two of the recess regions are present at opposing long sides of the sensor element.

7. A method of manufacturing a gas sensor, the gas sensor comprising:
   a sensor element extending in an axial direction, having an approximately rectangular cross section taken perpendicularly to the axial direction and having a pair of long sides and a pair of short sides, the sensor element having an electrode pad on an outer surface of a rear end portion;
   a metal terminal member in direct contact with the electrode pad for electrical connection; and
   a separator formed of ceramic, having an element hole that extends therethrough in the axial direction while surrounding the rear end portion of the sensor element, and holding the metal terminal member such that the metal terminal member is exposed to the element hole, as viewed from one of a forward-end side or a rear-end side in the axial direction, the separator has an end surface which is a surface located farthest in the axial direction toward the one of the forward-end side or the rear-end side, and recess regions recessed from the end surface and including the element hole;

the method comprising a step of placing a green separator on a firing bed with its end surface facing the firing bed, followed by firing to obtain the separator, wherein, in a view of the green separator from the one of the forward-end side or the rear-end side, a pair of first regions and a pair of second regions are present, where the first regions are determined by eliminating an element-insertion-expected region SD into which the sensor element is to be inserted, from a region SA defined by an outer edge of the green separator and imaginary short-side lines obtained by imaginarily extending a pair of short sides of the region SD and where the second regions are determined by eliminating the region SD from a region SC defined by the outer edge of the green separator and imaginary long-side lines obtained by imaginarily extending a pair of long sides of the region SD such that the second regions do not overlap the first regions, wherein the recess regions are present in all the first regions and the second regions which are located around the element-insertion-expected region SD and the total number of which is four, and wherein a relation of $S2/S1 \geq 0.5$ is satisfied, where S1 is a total area of the first regions and the second regions, and S2 is a total area of the recess regions including the element hole of the green separator.

* * * * *